April 21, 1925.
J. P. COLGAN
FLAP FOR CLINCHER TIRES
Filed July 13, 1922
1,534,686
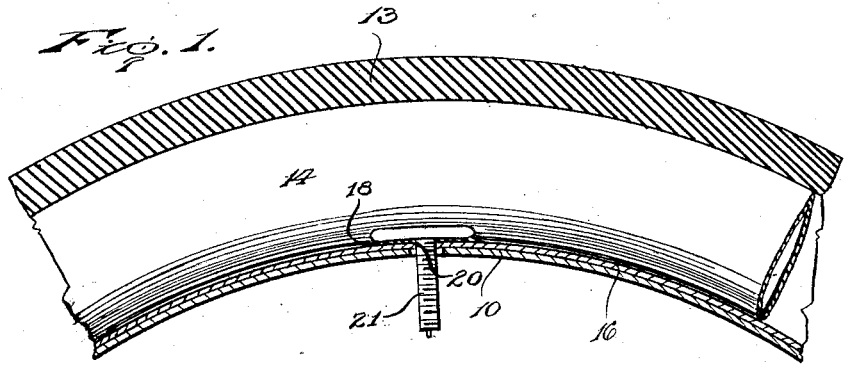
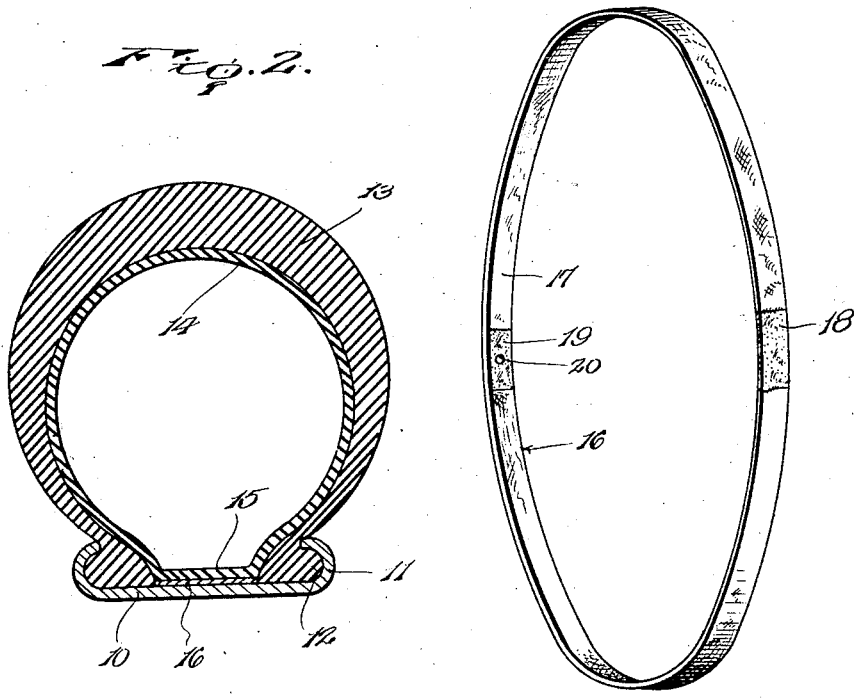
Inventor
J. P. Colgan.
By Lacey & Lacey, Attorne Patented Apr. 21, 1925.

1,534,686

UNITED STATES PATENT OFFICE.

JOHN P. COLGAN, OF WAYCROSS, GEORGIA.

FLAP FOR CLINCHER TIRES.

Application filed July 13, 1922. Serial No. 574,668.

*To all whom it may concern:*

Be it known that I, JOHN P. COLGAN, a citizen of the United States, residing at Waycross, in the county of Ware and State of Georgia, have invented certain new and useful Improvements in Flaps for Clincher Tires, of which the following is a specification.

The present invention relates to flaps intended to be inserted between the rim and tube of pneumatic tire wheels and is more particularly intended for use on so-called clincher rims.

Pneumatic tires are generally mounted directly in the bottom of a rim and when the rim rusts, the rust is apt to seriously injure the parts of the pneumatic tube with which it comes in contact. The rough surface of the rim is also apt to chafe or scratch the thin material of which the pneumatic tubes are made and also in this manner injure the latter.

To overcome these disadvantages, the aim of the present invention is to provide a protective device for pneumatic tubes and to stretch a band of suitable material around the rim fitting tightly in its bottom to prevent the pneumatic tube to come in direct contact with the metal.

In the accompanying drawing one embodiment of the invention is illustrated,—

Figure 1 shows a circumferential fragmentary section of a wheel rim and tire with the flap inserted;

Figure 2 is a transverse section of Figure 1;

Figure 3 is a perspective view of an endless band forming the subject-matter of the present invention.

The reference numeral 10 represents a wheel rim of the clincher type, but it is evident that the invention applies equally well to any other kind of rim. The inturned annular flanges 11 on the rim engage in the usual manner with the beads 12 of the tire shoe 13 to hold the latter securely in place. The inflated pneumatic tire 14 is shown to fit inside of the shoe 13 and to project downwardly between the beads 12, as at 15. Between this portion 15 and the bottom of the rim 10 is now inserted the protective band 16, as seen in Figures 1 and 2, in order to prevent the pneumatic tube 14 from contacting with the more or less rough surface of the rim 10.

This protective band 16 preferably consists of a narrow tape or ribbon 17 of fabric, such as canvas or the like. The two ends of the ribbon are connected by means of a piece of rubber 18 of the same width and thickness as the ribbon, and this piece of rubber is preferably vulcanized or cemented to the ends of the ribbon which, in this manner, forms an endless band. The purpose of the elastic portion is to permit the band to slip over the flanges 11 of the rim 10 and to compel the ribbon to fit tightly in the bottom thereof without forming folds or wrinkles.

It will now be evident that any rust formed on the rim 10 may be rubbed off by the canvas protective band without injuring the pneumatic tube 14 and as there is no direct contact between the latter and the rim, no chafing of the pneumatic tube can occur but that all such chafing will be made on the protective band 16 instead.

The length of the rubber insertion varies according to the diameter of the wheel, but a length of from four to six inches has been found suitable for a thirty-inch tire.

The advantage of using protective bands of this character resides in the fact that the life of the pneumatic tube will be considerably lengthened and that the protective band 16 being of considerably less cost than the pneumatic tube may easily be replaced whenever injured or worn out.

In order to prevent leakage around the air valve, I preferably reinforce the protective band with a patch of rubber 18 where the valve is located in the rim, an opening 20 being furnished through the fabric and the patch for the valve 21. As the rubber patch draws up closely around the valve, no leakage will be possible. This rubber patch being vulcanized on the band around the opening 20, keeps the fabric from being torn and also prevents water from entering around the valve stem.

Having thus described the invention, what is claimed as new is:

1. An endless tire flap comprising a flat ribbon of inelastic material having its ends joined by a piece of elastic material.

2. An endless tire flap comprising a flat ribbon of fabric having its ends joined by a piece of elastic material.

3. An endless tire flap comprising a flat ribbon of fabric having its ends joined by a piece of rubber.

4. A tire flap comprising a ribbon of fabric having its ends joined by a piece of rubber vulcanized to the ribbon to form an endless flat band therewith adapted to fit tightly in the bottom of the rim under the tube of a pneumatic tire.

5. A tire flap comprising a ribbon of fabric having its ends joined by a piece of rubber vulcanized to the ribbon to form an endless flat band therewith adapted to fit tightly in the flat bottom of the rim under the tube of a pneumatic tire, and a patch of vulcanized rubber across a portion of the ribbon, an opening being provided through said patch and the adjacent ribbon portion adapted to receive an air valve stem.

6. A device for disposal about a wheel rim to protect the inner tube of the tire thereon from contact with the bottom of the channel of the rim, comprising an endless band consisting of a flat, thin band of fabric and an interposed single, relatively thin and flat ply of soft rubber vulcanized at its ends to the ends of the fabric band and extending therebetween.

In testimony whereof I affix my signature.

JOHN P. COLGAN. [L. S.]